Dec. 27, 1927.
A. E. VEATCH
DENTAL CASTING DEVICE
Filed May 28, 1926
1,654,026
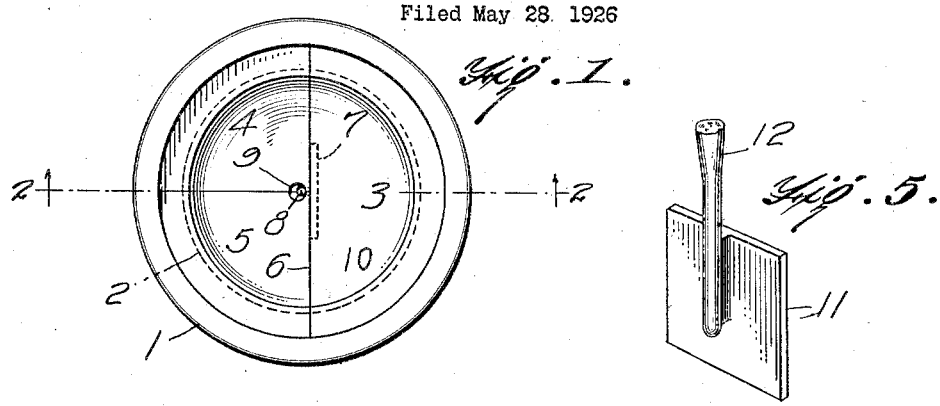
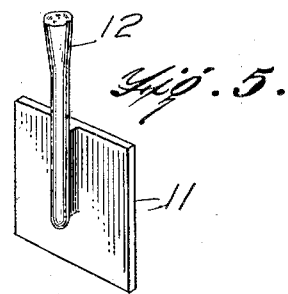
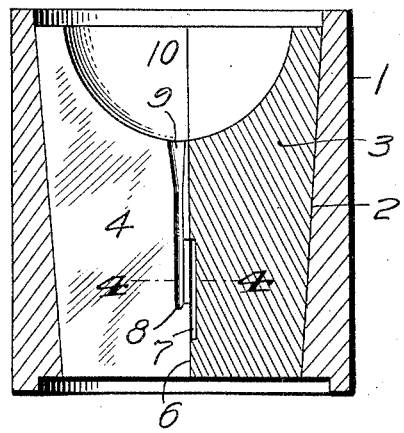
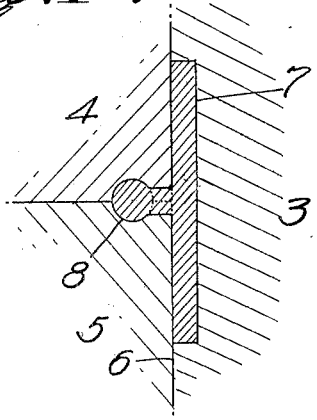
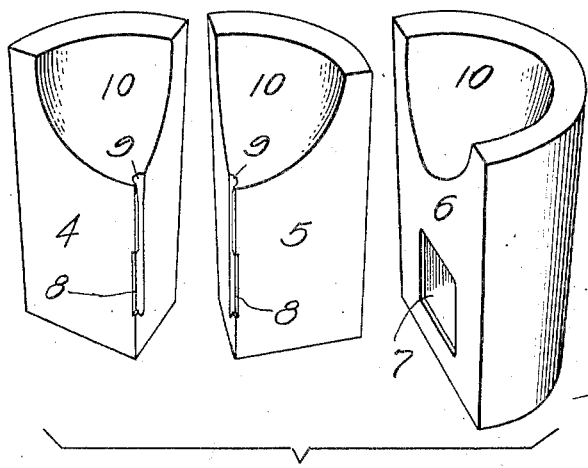
Inventor
A. E. VEATCH,
By
Attorney Patented Dec. 27, 1927.

1,654,026

UNITED STATES PATENT OFFICE.

ALVIN E. VEATCH, OF KELSO, WASHINGTON.

DENTAL CASTING DEVICE.

Application filed May 28, 1926. Serial No. 112,285.

This invention is directed to an improvement in molds, designed particularly for dentists' use, and constructed to permit convenient molding of the usual backings employed with interchangeable facings in the making of teeth.

Backings of this type are usually manufactured in quantities and sold to the dentist for application to the facings as needed. As the dentists usually have more or less scrap gold or gold alloy on hand from their incidental operations, it might well be that with an appropiate molding machine such scraps could be readily and economically turned into backings directly by the dentist.

The main object of the present invention is to construct a mold capable of use with a molding machine and which will permit the convenient and economic molding of the backings without other equipment.

A further object of the invention is the production of a mold in separable sections of a nature as to insure a proper molding and withdrawal of the backing, with the mold parts more or less porous to permit the escape of entrapped air, to thereby insure a perfect molded replica of the pattern.

The invention is illustrated in the accompanying drawings, in which:—

Fig. 1 is a plan view of the mold.

Fig. 2 is a vertical section of the same on the line 2—2 of Fig. 1.

Fig. 3 is a perspective view, showing the parts of the mold separated.

Fig. 4 is a section on the line 4—4 of Fig. 2.

Fig. 5 is a perspective view of the backing.

The improved mold includes a casing or shell 1, open at top and bottom, with the inner wall downwardly convergent, as at 2. The mold proper is made up in three parts or sections, one such section, as 3, constituting one half the mold, and the other sections, as 4 and 5, together constituting the other half of the mold. The sections 4 and 5 are of equal size, each constituting one quarter of the mold, with the line of division extending at right angles to the face 6 of the section 3.

The mold sections together for a rounded body fitting snugly within the shell 1, and of slight conical formation exteriorly, so that when fitting into the shell, as when in position for molding, all sections will fit closely together. The face 6 of the section 3, which is the diametric face of the mold proper, is formed near its lower end with a molding recess 7, of slight depth and of rectangular outline, to form the backing proper. The sections 4 and 5 are formed at the junctures of their faces engaging the section 3, and their abutting faces, with a recess 8, formed half in one section and half in the other, this recess being of rodlike form and being open to the recess 7 when the mold sections are assembled, to thereby form the rod projection of the backing. Immediately above and communicating with the recesses 8, each section 4 and 5 is formed with a pouring gate in the form of a channel 9, half in one section and half in the other, but this channel is offset from and wholly closed against the plain face of the mold half formed by the sections 4 and 5 when assembled.

The upper portions of all mold sections as formed together present a semispherical depression 10, from which the channel leads, the upper portion of this channel 9 being of gradually increased diameter toward the depression.

In use the mold sections are assembled in the shell, and the melted gold is poured into the depression 10, finding its way into the recesses 7 and 8 to form the backing shown in Fig. 5, which is made up of the plate 11 and the rod 12. The gold may be forced into the mold recesses in any usual or preferred manner.

In order to permit escape of entrapped air, and permit a desired replica to be molded, the mold sections, or if desired the section 3 alone, may be more or less porous. This insures that all portions of the mold recesses will be taken up and filled.

After molding the molding sections are withdrawn from the shell and the sections opened or formed apart, leaving the article in the section 3, though readily separable therefrom by means of the rod formation. The rod is then cut off to the proper length and the plate 11 shaped to the required tooth shape, as is usual.

Having thus described the invention, what is claimed as new, is:—

A mold for tooth backings, comprising a shell, and a three-part mold proper adapted to be wedged into the shell, one part of the mold being formed to completely mold the tooth-backing proper, and the other parts together being formed to mold the rod projection of the tooth backing, the mold opening of the rod projection form leading to the mold form for the tooth backing, whereby the metal is poured through the rod projection form to reach the tooth-backing form and the separation of the parts for molding the rod projection leaves the molded article supported by the remaining mold part with the formed rod projection arranged wholly beyond such part.

ALVIN E. VEATCH.